United States Patent [19]
Durnil

[11] Patent Number: 4,781,403
[45] Date of Patent: Nov. 1, 1988

[54] ARTICULATED CONDUIT COUPLING

[75] Inventor: Michael W. Durnil, Louisville, Ky.

[73] Assignee: Carrier Vibrating Equipment, Inc., Louisville, Ky.

[21] Appl. No.: 8,634

[22] Filed: Jan. 29, 1987

[51] Int. Cl.⁴ .............................................. A16L 7/00
[52] U.S. Cl. ...................................... 285/94; 285/272
[58] Field of Search ............... 285/273, 264, 272, 275, 285/276, 94

[56] References Cited

U.S. PATENT DOCUMENTS

| 777,306 | 12/1904 | Rawlinson | 285/264 X |
| 1,067,516 | 7/1913 | Gleeson | 285/264 X |
| 1,620,094 | 3/1927 | Gillick | 285/264 X |

FOREIGN PATENT DOCUMENTS 629963 6/1953 United Kingdom ................. 285/264
2073842 10/1981 United Kingdom ................. 285/272

Primary Examiner—Dave W. Arola
Attorney, Agent, or Firm—Jon C. Winger

[57] ABSTRACT

An articulated conduit coupling for attaching two conduits together so that the conduits can move or vibrate in a generally radial direction relative to each other without rupturing the conduits includes a first conduit section which is coaxial to a second conduit section. The second conduit section has one end which is sized to be concentrically received within one end of the first conduit section. The articulated conduit coupling also includes two radially extending pivot pins in diametrical alignment with each other projecting through the walls of the overlapped section conduit section and overlapping first conduit section so that the first and second conduit sections can move relative to each other in a direction 90 degrees to the axis of the pivot pins.

16 Claims, 4 Drawing Sheets

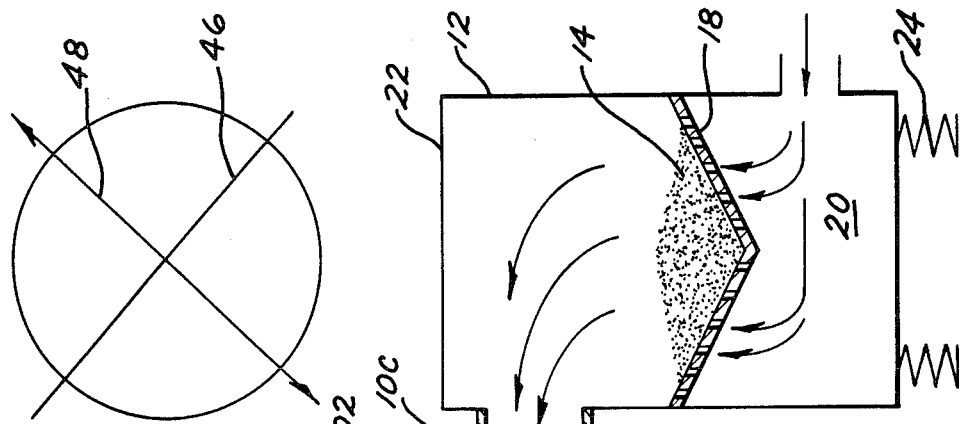
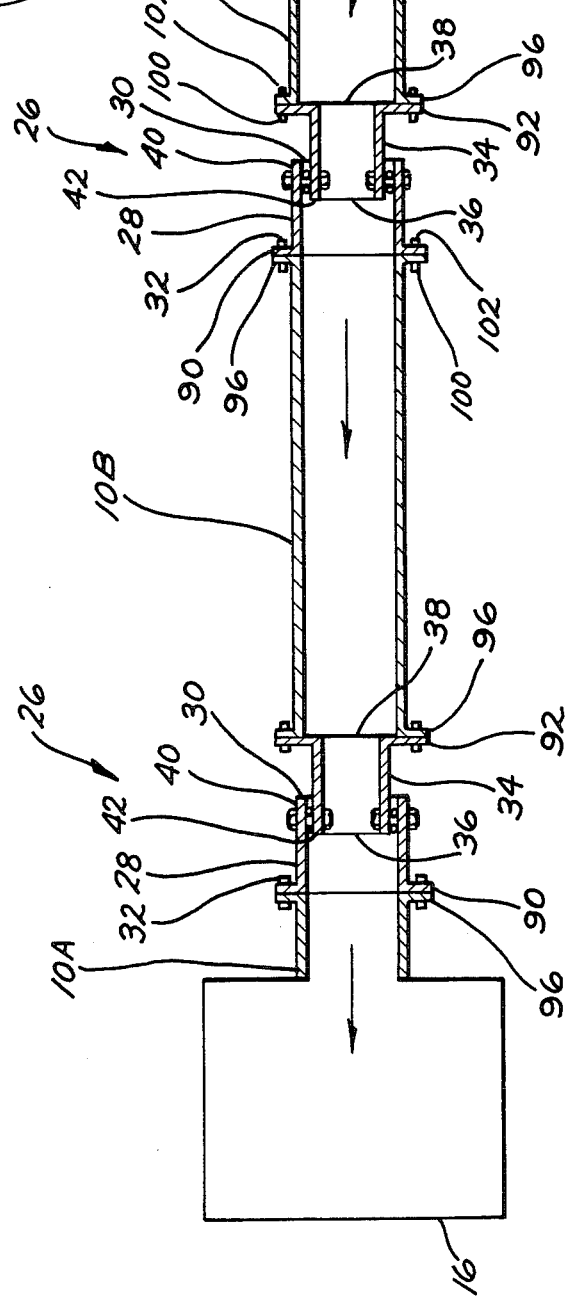

ARTICULATED CONDUIT COUPLING

FIELD OF THE INVENTION

The present invention relates to ducts or conduits which allow for the movement of apparatuses interconnected by the conduit, and more particularly to such ducts and conduits for conveying gas, especially hot gas.

BACKGROUND OF THE INVENTION

Conduits or ducts are used to interconnect apparatuses for conveying a gas therebetween. Often times, the apparatuses are subjected to movement or vibration. If the interconnecting conduit or duct is rigid, the walls of the conduit will, sooner or later, fracture.

Corrugated or accordian-pleated conduits have been used in such applications. Such accordian-pleated conduits flex as the pleats fold and unfold, thus, compensating for the relative motion of the apparatus interconnected by the accordian-pleated conduit. However, eventually the walls of the accordian-pleated conduit will fatigue at the folds and will rupture. In addition, the interior wall surface of these accordian-pleated conduits interfere with the smooth flow of gas therethrough which can cause disruptive eddies in the gas flow. Furthermore, if the gas flowing through the conduit is carrying particulate matter, the particulate matter will abrade the pleats or folds of the accordian-pleated conduit. In addition, the particulate matter being carried by the gas can be trapped by the pleats or folds and build-up on the interior surface of the conduit. Even further, corrugated conduits are expensive.

Conduits for conducting gas made of a flexible fabric material have also been used to interconnect apparatuses to compensate for movement or vibration of the apparatuses. However, such fabric conduits have a number of drawbacks. The fabrics known to me are not capable of withstanding high temperature hot gases and, therefore, disintegrate over time. It has been experienced that when a fabric conduit has been sufficiently weakened by deterioration, the fabric conduit can actually explode.

SUMMARY OF THE INVENTION

The present invention recognizes the drawbacks of the prior known conduits and ducts, and provides a straightforward solution to the problem of interconnecting apparatuses allowing for movement thereof without damage to the conduit.

An advantage of the present invention is that it allows for the replacement of only that section of a duct which may be damaged without the necessity of replacing the entire length of duct.

Another advantage of the present invention is that it eliminates crevices, edges or formations in the conduit wall which can be abraded by particulate matter entrained in the gas flowing through the conduit.

A further advantage of the present invention is that it provides a conduit for conveying hot gases without deterioration of the conduit.

More particularly, the present invention provides an articulated conduit coupling comprising a first conduit section having first and second ends, a second conduit section coaxially located with the first conduit section and having a first end of a cross-sectional area sufficiently smaller than the cross-sectional area of the first end of the first conduit section such that the first end of the second conduit is concentrially received within the first end of the first conduit section and such that a portion of the first end of the first conduit section overlaps a portion of the first end of the second conduit section, and means for pivotally diametrically interconnecting the overlapped portion of the second conduit section and overlapping portion of the first conduit section such that the diametric pivot axis is 90 degrees to the direction of relative motion between the first conduit section and second conduit section.

BRIEF DESCRIPTION OF THE DRAWINGS

The objectives, features and advantages of the present invention will become more clear upon reference to the following description in conjunction with the accompanying drawings in which like numerals refer to like parts throughout the several views and wherein:

FIG. 1 is a diagrammatical longitudinal cross-sectional view of a conduit incorporating the articulated conduit couplers of the present invention interconnecting apparatuses;

FIG. 4 is a diagrammatical transverse cross-sectional representation of one of the articulated conduit couplers of FIG. 1 showing the movement of the conduit relative to the articulated joint of the coupler of the present invention;

DETAILED DESCRIPTION OF THE PREFERRED EMBODIMENT

Figure 2:
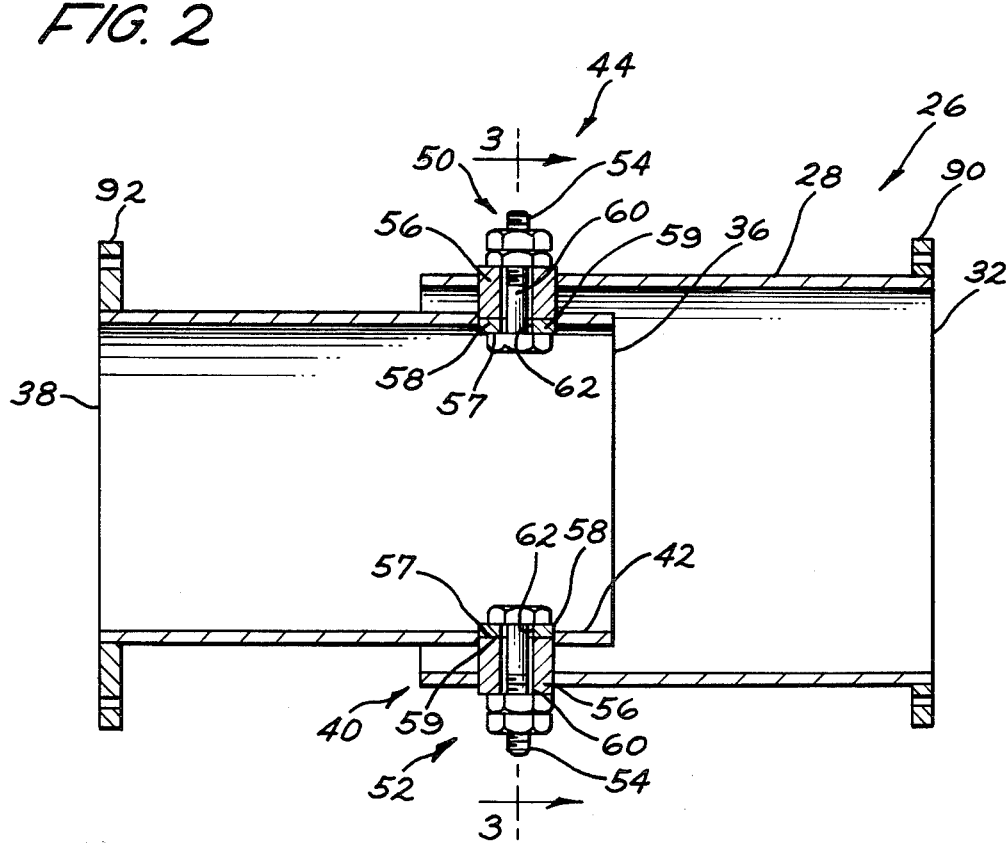
FIG. 2 is an enlarged longitudinal cross-sectional view of the conduit coupler more clearly showing details of one advantageous embodiment of the present invention.

With reference to FIG. 1, there is shown a diagrammatic representation of a conduit, generally denoted as the numeral 10, interconnecting apparatuses.

The apparatuses can be, for example, some type of vibrating conveyor device 12 for conveying a fluidized bed 14 of particulate material interconnected to a particulate material separator device 16. In the illustrated example of a vibrating conveyor device 12, the bed 14 of particulate material is conveyed along a perforated trough 18 and a gas such as hot air is pumped into the plenum 20 of the vibrating conveyor device 12 beneath the perforated trough 18. The hot gas such as air flows upwardly from the plenum 20 through the perforated trough 18 to fluidize the particulate material bed 14. The conveyor device 12 includes an exhaust hood 22 over the trough 18 which collects the fluidizing hot gas above the trough 18. The hood 22 is interconnected to the separator device 16 for conveying the fluidizing air and any entrained particulate material to the separator device 16.

The vibrating conveyor device 12 is mounted on resilient devices such as, for example, coil springs 24 and is caused to vibrate. The vibrational force imparted to the conveyor device 12 causes the bed of particulate material to move or be conveyed along the trough 18. Various vibrating conveyor devices 12 and separator devices 16 are well known in the art and, therefore, for the sake of brevity, they will not be further described.

With continued reference to FIG. 1 and additional reference to FIG. 2, there is shown the duct or conduit 10 incorporating articulated conduit coupling devices, generally denoted as the numeral 26, of the present invention.

The articulated conduit coupling 26 comprises a first conduit section 28 having a first end 30 and a second end 32, and a second conduit section 34 having a first end 36 and a second end 38. The first conduit section 28 and second conduit section 34 are coaxially located. At least the first end 36 of the second conduit section 34 is of a cross-sectional area sufficiently smaller than the cross-sectional area of the first end 30 of the first conduit section 28 so that the first end 36 of the second conduit section 34 is concentrically received within the first end 30 of the first conduit section 28 with a circumferential space or clearance between the walls of the second conduit section 34 and first conduit section 28 and such that a portion 40 of the first conduit section 28 overlaps a portion 42 the second conduit section 34.

Figure 3:
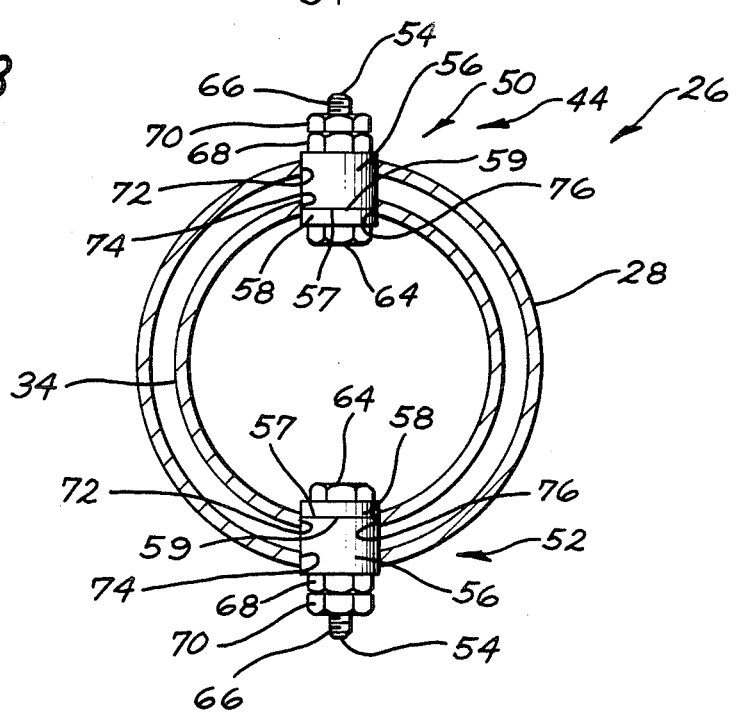
FIG. 3 is an enlarged transverse cross-sectional view of the conduit coupler of FIG. 2 as seen in the direction of arrow 3—3 in FIG. 2.

With reference to FIGS. 2 and 3, the articulated conduit coupling 26 further pivot means, generally denoted as the numeral 44, for diametrically pivotally interconnecting the overlapped portion 42 of the second conduit section 34 and overlapping portion 40 of the first conduit section 28 such that the diametric pivot axis is 90 degrees to the direction of relative motion between the first conduit section 28 and second conduit section 34. For example, in the illustrated use in a conduit 10 interconnecting a vibrating conveyor device 12 to a separator device 16, the pivotal axis of the articulated conduit coupling 26 would be oriented 90 degrees to the direction of the vibrating force imparted to the vibrating conveyor device 12 as illustrated schematically in FIG. 4 wherein the pivot axis of pivot means 44 is denoted by the diametrical line 46 and the vector of the vibrating force is denoted by the double headed arrow 48. The pivot means 44 comprises a first pivot device 50 pivotally interconnecting the overlapping portion 40 of the first conduit section 28 and the underlapped portion 42 of the second conduit section 34, and a second pivot device 52 in diametrical alignment across the conduit coupling 26 pivotally interconnecting the overlapping portion 40 of the first conduit section 28 and the underlapped portion 42 of the second conduit section 34. The pivot device 50 and pivot device 52 are identical and, therefore, only the first pivot device 50 will be described, it being understood that the following description applies to the second pivot device 52 as well. The pivot device includes a pivot pin 54 extending radially of the first conduit section 28 and second conduit section 34 projecting through the wall of the overlapped portion 42 of the second conduit section 34 and through the wall of the overlapping portion 40 of the first conduit section 28. The pivot pin 54 of the first pivot device 50 and the pivot pin 54 of the second pivot device 52 are in alignment on the diameter of the conduit coupling 26. As can be best seen in FIG. 2 through 4, the pivot device 44 further includes a first pivot bushing 56 affixed to the wall of the overlapping portion 40 of the first conduit section 28 and a second pivot bushing 58 affixed to the wall of the overlapped portion 42 of the second conduit section 34 in radial alignment with the first pivot bushing 56. The first pivot bushing 56 has a through bore 60 and the second pivot bushing 58 has a through bore 62. The through bores 60 and 62 are in alignment with each other on the radius of the conduit coupling 26 and receive the pivot pin 54 therethrough. The first pivot bushing 56 has a bearing surface 57 at the concave interior side of the first conduit section 28 and the second bearing bushing 58 has a bearing surface 59 at the convex exterior side of the second conduit section 34 which mates with the bearing surface 57 of the first pivot bushing 56 to form a bearing interface therebetween.

With continued reference to FIGS. 2 and 3, there is shown a particular structural relationship between the first pivot bushing 56 and first conduit section 28, and between the second pivot bushing 58 and second conduit section 34. The first pivot bushing 56 is shown as being cylindrical in shape with the through bore 60 concentric therewith and the bearing surface 57 at one end. The first pivot bushing 56 is positioned in an appropriately sized aperture 72 in the wall of the first conduit section 28 and projects into the interior of the first conduit section 28 such that the bearing surface 57 is locate a distance inwardly of the first conduit section 28 from the interior concave surface of the first conduit section 28. Thus, the bearing surface 57 is parallel to a line tangent to the interior concave surface of the first conduit section 28 at the centerline of the bushing receiving aperture 72. The second pivot bushing 58 is also shown as being cylindrical in shape with the through bore 62 concentric therewith and the bearing surface 59 at one end. However, the second pivot bushing 58 is positioned in an appropriately sized aperture 74 in the wall of the second conduit section 34 with the bearing surface 59 recessed from the convex exterior surface of the second conduit section 34. The recess of the second pivot bushing 58 is indicated by the numeral 76. Thus, the bearing surface 59 is parallel to a line tangent to the exterior convex surface of the second receiving section 34 at the centerline of the bushing receiving aperture 74. When the first conduit section 28 is assembled to the second conduit section 34 with a clearance space between the overlapping position 40 of the second conduit section 34, the projecting end of the first conduit section 28 and overlapped portion 42 of the first pivot bushing 56 is seated in the bushing recess 76 with the bearing surface 57 of the first pivot bushing 56 in bearing contact with the bearing surface 59 of the second pivot bushing 58.

As can be best seen in FIG. 2, the pivot pin 54 retaining means for retaining the pin 54 in place in the first pivot bushing 56 and second pivot bushing 58. Toward this objective, the pivot pin 54 is illustrated as being formed with a head 64 at one end and machine threads 66 formed in the pin 54 near the other end. The pivot pin 54 is preferably installed from the inside of the second conduit section 34 with the head 64 adjacent the second pivot bushing 58 interior of the second conduit section 34 such that the pivot pin 54 projects through the bore 62 of the second pivot bushing 58 radially outwardly of the second conduit section 34 and through the bore 60 of the first pivot bushings 56 radially outwardly or the first conduit section 28 with its end having the machine threads 66 projecting from the first pivot bushing 56 to the outside of the first conduit section 28. The pivot pin is locked in place by locking means shown as threaded fastener, such as a first machine nut 68 and a second machine nut 70. The first machine nut 68 is threaded over the projecting threaded end of the pivot pin 54 with a clearance between the machine nut 68 and first pivot bushing 56, and the second machine nut 70 is threaded over the threads of the pivot pin 54 tightly against the machine nut 68. The machine nuts 68 and 70 function as jam nuts preventing rotation of either nut 68 and 70. The use of the jam nuts 68 and 70 provide for locking the pivot pin 54 in place without creating longitudinal tension forces on the pivot pin 54. It is contemplated that the pivot pin 54 fit through the bore 60 of the first pivot bushing 56 and through the bore 62 of the second pivot bushing 58 with a clearance fit. Therefore, the use of the jam nuts 68 and 70 allows the pivot pin 54 to move or shift within the clearance of the bores 60 and 62 as the conduit coupler articulates about the pivot pins 54. This movement of the pivot pin 54 is the bore clearances provides for a slight shift in the position of the pivot axis 44 as the first and second conduit sections 28 and 34 pivot with respect to each other.

Figure 5:
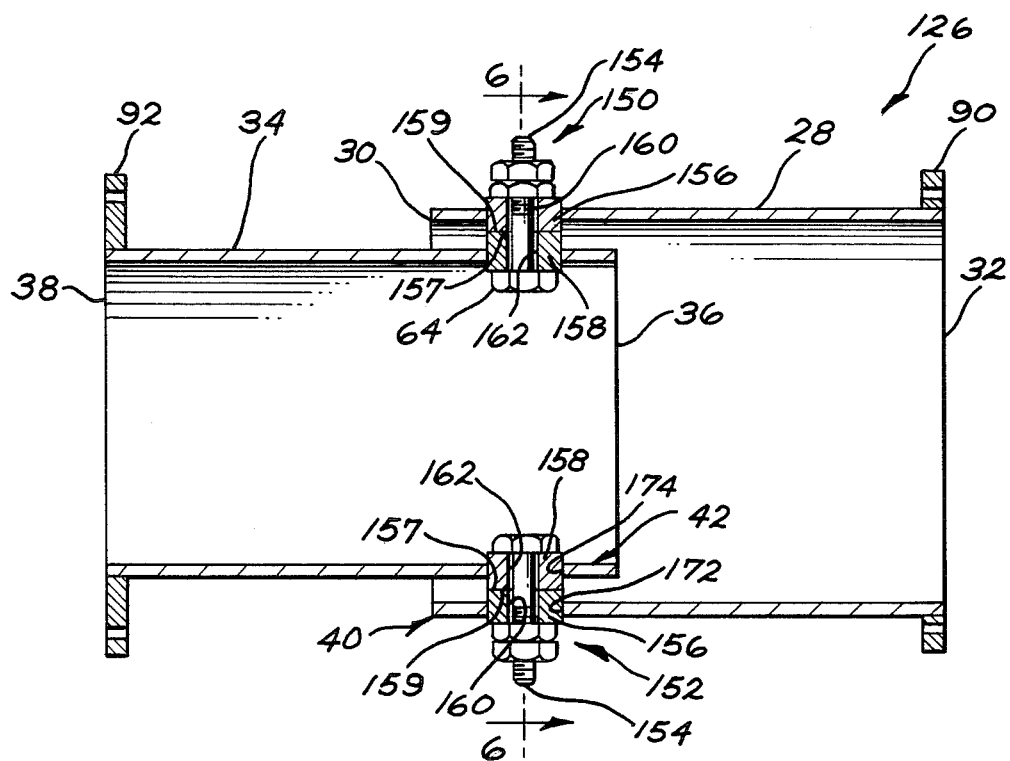
FIG. 5 is an enlarged longitudinal cross-sectional view of the conduit coupler more clearly showing details of another advantageous embodiment of the present invention.

Now with reference to FIG. 5, there is shown another advantageous embodiment of an articulated conduit coupling 126 comprising pivot means, generally denoted by the numeral 144 similar to the pivot means 44, for diametrically pivotally interconnecting the overlapped portion 42 of the second conduit section 34 and overlapping portion 40 of the first conduit section 28. The pivot means 144 comprises a first pivot device 150 and a second pivot device 152 in diametrical alignment across the coupling 126. The pivot device 150 and pivot device 152 are identical and, therefore, only the first pivot device 150 will be described, it being understood that the following description applies to the second pivot device 152 as well. The pivot device includes a pivot pin 154 extending radially of the first conduit section 28 and second conduit section 34 projecting through the wall of the overlapped portion 42 of the second conduit section 34 and through the wall of the overlapping portion 40 of the first conduit section 28. The pivot pin 154 of the first pivot device 150 and the pivot pin 154 of the second device 152 are in alignment of the diameter of the coupling device 126. As can be best seen in FIGS. 5 and 6, the pivot device further includes a first pivot bushing 156 affixed to the wall of the overlapping portion 40 of the first conduit section 28, and a second pivot bushing 158 affixed to the wall of the overlapped portion 42 of the second conduit section 34 in radial alignment with the first pivot bushing 156. The first pivot bushing 156 has a through bore 160 and the second pivot pin bushing 158 has a through bore 162. The through bores 160 and 162 are in alignment with each other on the radius of the conduit coupling 126 and receive the pivot pin 154 therethrough. The first pivot bushing 156 has a bearing surface 157 at the concave interior side of the first conduit section 28 and the second bearing bushing 158 has a bearing surface 159 at the convex exterior side of the second conduit section 34 which mates with the bearing surface 157 to form a bearing interface therebetween.

With continued reference to FIG. 5, there is shown a particular relationship between the first pivot bushing 156 and first conduit section 28, and between the second pivot bushing 158 and second conduit section 34 which differs somewhat from the like relationships of the pivot bushings 56 and 58 shown in FIGS. 2-4 and described above. The first pivot bushing 156 is shown as being cylindrical in shape with the through bore 160 concentric therewith and the bearing surface 157 at one end. The first pivot bushing 156 is positioned in an appropriately sized aperture 172 in the wall of the first conduit section 28 and projects a predetermined distance into the interior of the first conduit section 28, that is into the clearance space between the first conduit section 28 and the second conduit section 34, such that the bearing surface 157 is located a distance inwardly from the interior concave wall surface of the first conduit section 28. Thus, the bearing surface 157 is parallel to a line tangent to the interior concave surface of the first conduit section 28 at the centerline of the bushing receiving aperture 172 and is located in the clearance space between the first conduit section 28 and second conduit section 34. The second pivot bushing 158 is also shown as being cylindrical in shape with the through bore 162 concentric therewith and the bearing surface 159 at one end. The second pivot bushing 158 is positioned in an appropriately sized aperture 174 in the wall of the second conduit section 34 and projects a predetermined distance outwardly of the second conduit section 34, that is into the clearance space between the first conduit section 28 and the second conduit section 34, such that the bearing surface 159 is located a distance outwardly from the exterior convex wall surface of the second conduit section 34. Thus, the bearing surface 159 is parallel to a line tangent to the exterior convex surface of the second conduit section 34 at the centerline of the bushing receiving aperture 174 and is located in the clearance space between the first conduit section 28 and second conduit section 34. Thusly, the bearing interface of the bearing surface 157 of the first pivot bushing 156 and bearing surface 159 of the second pivot bushing 158 is located in the clearance space between the overlapping portion 40 of the first conduit section 28 and overlapped portion 42 of the second conduit section 34. For example, the first pivot bushing 156 projects from into the interior of the first conduit section 28 by a distance equal to one half the clearance space between the overlapping portion 40 of the first conduit section 28 and overlapped portion 42 of the second conduit section 34, and the second pivot bushing 158 projects outwardly of the second conduit section 34 by a distance equal to one half the clearance space between the overlapping portion 40 of the first conduit section 28 and overlapped portion 42 of the second conduit section 34.

Figure 6:
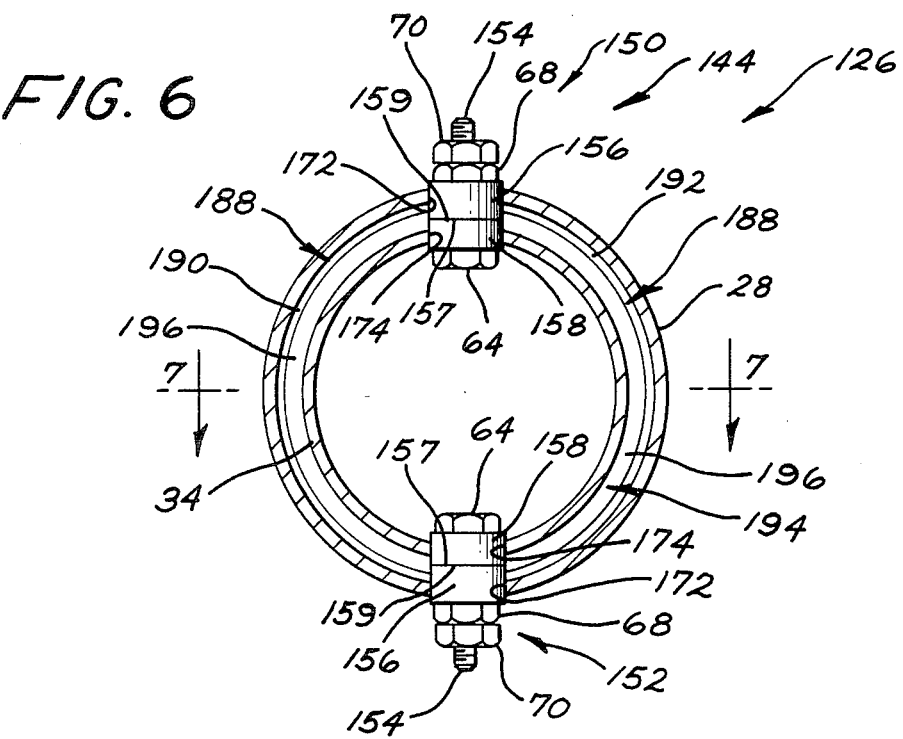
FIG. 6 is an enlarged transverse cross-sectional view of the conduit coupler of FIG. 5 as seen in the direction of arrows 6—6 in FIG. 5.
Figure 7:
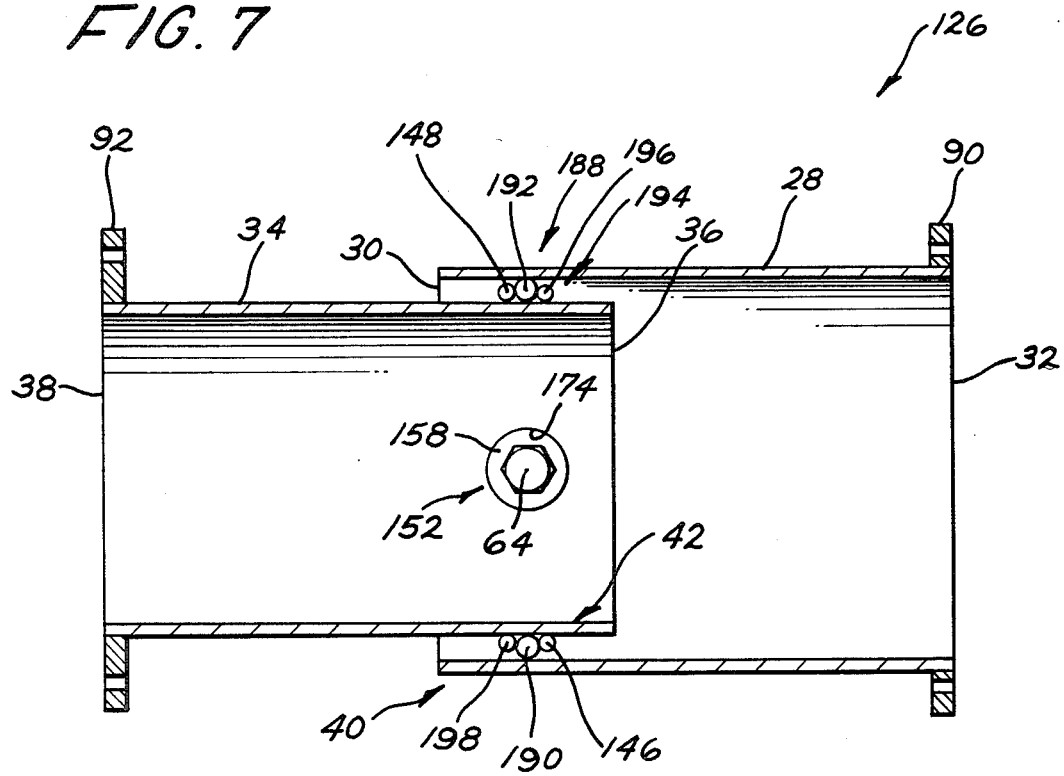
FIG. 7 is a cross-sectional view of a portion of the conduit coupler as seen in the direction of arrows 7—7 in FIG. 6; and, FIG. 8 is an enlarged view of another component of the present invention.
Figure 8:
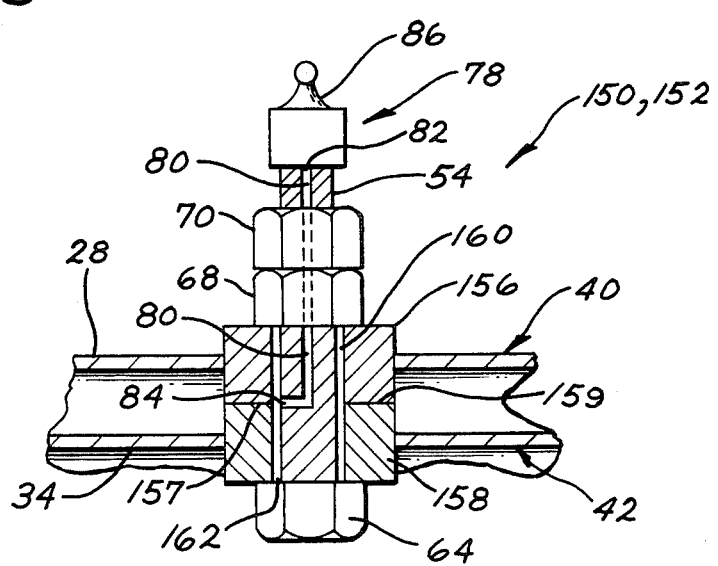

As can be best seen in FIGS. 6 and 7, the coupler device 126 further includes sealing means, generally denoted as the numeral 188, for sealing the clearance space between the overlapping portion 40 of the first conduit section 28 and overlapped portion 42 of the second conduit section 34. Toward this objective, the sealing means 188 comprises two semi-circular seals 190 and 192 in circumferential alignment with each other in the clearance space and in sealing contact with the concave interior wall surface of the overlapping portion 40 of the first conduit section 28 and in sealing contact with the convex exterior wall surface of the overlapped portion 42 of the second conduit section 34. The two semi-cylindrical seals 192 and 194 are each located in a different one of the two arcuate segments of the clearance space between the first pivot device 150 and second pivot device 152. One end of each of the semi-circular seals 190, 192 is in abutment with the exterior surface of the first and second bushings 156, 158 of the first pivot device 150 and the other end of each of the semi-circular seals 190, 192 is in abutment with the exterior surface of the first and second bushings 156, 158 of the second pivot device 152. The semi-circular seals 190, 192 are retained in position in the longitudinal direction of the first conduit section 28 and second conduit section 34 in the clearance space by retaining means, generally denoted as the numeral 194. The seal retaining means 194 is shown as comprising two pairs of semi-circular bands 196 and 198. One pair of semi-circular bands 196 and 198 are positioned on either side of and coextensive with the semi-circular seal 190, and the other pair of semi-circular bands 196 and 198 are positioned on either side of and coextensive with the semi-circular seal 192.

FIG. 7 illustrates a contemplated optional feature of the first and second pivot devices 50, 52 and 150, 152. For the sake of clarity, this feature will be discussed in regard to the first and second pivot means 150 and 152, however, it should be understood that it can be equally applied to the first and second pivot means 50 and 52 equally as well. The optional feature is means, generally denoted as the numeral 78, for lubricating the bearing surface 157 of the first pivot bushing 156 and the bearing surface 15 of the second pivot bushing 158. The lubrication means 78 comprises a lubrication channel 80 extending concentrically of the pivot pin 54. The lubrication channel 80 is open at the projecting end of the pivot pin 54 to form a lubrication inlet opening 82, and is open at the bearing interface of the bearing surface 157 of the first pivot bushing 156 and bearing surface 159 of the second pivot bushing 158. A valued lubrication fitting 86 of virtually any type well known to the art is affixed to the projecting end of the pivot pin 54.

With reference again to FIGS. 1, 2 and 5, the articulated conduit coupling 26, 126 is installed in the conduit 10 by virtually any means. As shown, the articulated conduit coupling 26, 126 is attached to sections 10A, 10B, 10C of conduit 10 by flanges. Toward this objective, the articulated coupling 26, 126 includes an outwardly projecting radial mounting flange 90 at the second end 32 of the first conduit section 28 and an outwardly projecting radial mounting flange 92 at the second end 38 of the second conduit section 34. The mounting flanges 90 and 92 have a plurality of bolt receiving holes formed therethrough. The ends of the conduit sections 10A, 10B and 10C coaxially registering with the ends 32 and 38 of the articulated conduit coupler 26 have outwardly projecting radial mounting flanges 96 which coaxially mate with the mounting flanges 90 and 92 of the articulated conduit coupling 26. The mounting flanges 96 have a plurality of bolt receiving holes which register with the bolt receiving holes in the flanges 90 and 92 to receive mounting bolts 100 therethrough. Machine nuts 102 are threaded on the bolts 100 to tightly fasten the conduit sections 10A, 10B and 10C to the articulated coupling 26.

The foregoing detailed description is given primarily for clearness of understanding and no unnecessary limitations are to be understood therefrom for modifications will become obvious to those skilled in the art upon reading this disclosure and may be made without departing from the spirit of the invention or scope of the appended claims.

What is claimed is:

1. An articulated conduit coupling comprising:
   a first conduit section having a first and section cylindrical ends;
   a second conduit section coaxially located with the first conduit section and having a first cylindrical end of a cross-sectional area sufficiently smaller than the cross-sectional area of the first conduit section such that the first cylindrical end of the second conduit section is concentrically received within the first cylindrical end of the first conduit section and such that a portion of the first cylindrical end of the first conduit section and such that a portion of the first cylindrical end of the first conduit section overlaps a portion of the first cylindrical end of the second conduit section with a clearance therebetween; and,
   pivot means for pivotally diametrically interconnecting the overlapped portion of the second conduit section and overlapping portion of the first conduit section such that the diametric pivot axis is 90 degrees to the direction of relative pivotal motion between the first conduit section and second conduit section, the pivot means preventing any rotation of the first conduit section and second conduit section relative to each other about the concentric axis of the first and second conduit sections.

2. The articulated conduit coupling of claim 1, wherein the pivot means comprises:
   a first pivot device pivotally interconnecting the overlapping portion of the first conduit section and overlapped portion of the second conduit section with the pivot axis on the diameter of the conduit coupling; and,
   a second pivot device in diametrical alignment with the first pivot device across the conduit coupling pivotally interconnecting the overlapping portion of the first conduit section and overlapped portion of the second conduit section with the pivot axis on the diameter of the conduit coupling in the diametrical alignment with the pivot axis of the first pivot device.

3. The articulated conduit coupling of claim 2, wherein:
   (a) the first pivot device comprises:
      a first pivot bushing affixed to the overlapping portion of the first conduit section, the first pivot bushing having a through bore;
      a second pivot bushing affixed to the overlapped portion of the second conduit section, the second pivot bushing having a through bore;
      the through bore of the first pivot bushing and the through bore of the second pivot bushing are in alignment with each other on the radius of the conduit coupling; and,
      a pivot pin received through the through bore of the first pivot bushing and through the through bore of the second pivot bushing; and,
   (b) the second pivot device comprises:
      a first pivot bushing affixed to the overlapping portion of the first conduit section, the first pivot bushing having a through bore;
      a second pivot bushing affixed to the overlapped portion of the second conduit section, the second pivot bushing having a through bore;
      the through bore of the first pivot bushing and the through bore of the second pivot bushing are in alignment with each other on the radius of the conduit coupling; and, a pivot pin received through the through bore of the first pivot bushing and through the through bore of the second pivot bushing.

4. The articulated conduit coupling of claim 3, wherein:
 (a) the pivot pin of the first pivot device is received through the aligned through bores of the first pivot bushing and the second pivot bushing with a clearance fit; and
 (b) the pivot pin of the first pivot device is received through the aligned through bores of the first pivot bushing and the second pivot bushing with a clearance fit.

5. The articulated conduit coupling of claim 3, further comprising:
 (a) means for retaining the pivot pin of the first pivot device in position in the aligned through bores of the first pivot bushing and second pivot bushing; and,
 (b) means for retaining the pivot pin of the second pivot device in position in the aligned through bores of the first pivot bushing and second pivot bushing.

6. The articulated conduit coupling of claim 5, wherein:
 (a) the retaining means of the pivot pin of the first pivot device exerts no longitudinal forces on the pivot pin; and,
 (b) the retaining means of the pivot pin of the second pivot device exerts no longitudinal forces on the pivot pin.

7. The articulated conduit coupling of claim 5, wherein:
 (a) the retaining means for the pivot pin of the first pivot device comprises:
  a head at one end adjacent the second pivot bushing interior of the second conduit section, the pin projecting through the aligned through bores of the first pivot bushing and second pivot bushing and projecting from the first pivot bushing to the outside of the first conduit section; and,
  means associated with the projecting end of the pin to lock the pin in place, and,
 (b) the retaining means for the pivot pin of the second pivot device comprises:
  a head at one end adjacent the second pivot bushing interior of the second conduit section, the pi projecting through the aligned through bores of the first pivot bushing and second pivot bushing and projecting from the first pivot bushing to the outside of the first conduit section; and,
  means associated with the projecting end of the pin to lock the pin in place.

8. The articulated conduit coupling of claim 7, wherein:
 (a) the locking means for the pivot pin of the first pivot device comprises:
  machine threads formed in the projecting end of the pin;
  a first machine nut threaded over the threads of the projecting end of the pin; and,
  a second machine nut threaded over the threads of the projecting end of the pin against the first machine nut; and,
 (b) the locking means for the pivot pin of the second pivot device comprises:
  machine threads formed in the projecting end of the pin;
  a first machine nut threaded over the threads of the projecting end of the pin; and
  a second machine nut threaded over the threads of the projecting end of the pin against the first machine nut.

9. The articulated conduit coupling of claim 2, wherein:
 (a) the first pivot device comprises:
  a first pivot bushing comprising a bearing surface facing inwardly of the interior concave side of the first conduit section;
  a second pivot bushing comprises a bearing surface facing outwardly of the exterior convex side of the second conduit section; and,
  the bearing surface of the first pivot bushing of the first pivot device and the bearing surface of the second pivot bushing of the first pivot device being in bearing contact; and,
 (b) the second pivot device comprises:
  a first pivot bushing comprising a bearing surface facing inwardly of the interior concave side of the first conduit section; and,
  a second pivot bushing comprising a bearing surface facing outwardly of the exterior convex side of the second conduit section; and,
 (c) the bearing surface of the second pivot bushing of the second pivot device and the bearing surface of the second pivot bushing of the second pivot device being in bearing contact.

10. The articulated conduit coupling of claim 9, wherein:
 (a) The bearing surface of the pivot bushing of the first pivot device is located a distance inwardly of the first conduit section from the interior concave surface of the first conduit section; and,
 the bearing surface of the second pivot bushing of the first pivot device is recessed from the exterior convex surface of the second conduit section; and,
 the first pivot bushing is seated in the recess; and,
 (b) the bearing surface of the first pivot bushing of the second pivot device is located a distance inwardly of the first conduit section from the interior concave surface of the first conduit section; and,
 the bearing surface of the second pivot bushing of the second pivot device is recessed from the exterior convex surface of the second conduit section; and,
 the first pivot bushing is seated in the recess.

11. The articulated conduit coupling of claim 9, wherein:
 (a) the bearing surface of the first pivot bushing of the first pivot device is located a distance inwardly of the first conduit section from the interior concave surface of the first conduit section and is positioned in the clearance space between the first conduit section and the second conduit section;
 the bearing surface of the second pivot bushing of the first pivot device is located a distance outwardly of the second conduit section from the exterior convex surface of the second conduit section and is positioned in the clearance space between the first conduit section and the second conduit section; and,
 the bearing interface of the bearing surface of the first pivot bushing and the bearing surface of the second pivot bushing is located in the clearance space between the overlapping portion of the first conduit section and overlapped portion of the second conduit section; and, (b) the bearing surface of the first pivot bushing of the second pivot device is located a distance inwardly of the first conduit section from the interior concave surface of the first conduit section and is positioned in the clearance space between the first conduit section and the second conduit section;

the bearing surface of the second pivot bushing of the second pivot device is located a distance outwardly of the second conduit section from the exterior convex surface of the second conduit section and is positioned in the clearance space between the first conduit section and second conduit section; and, the bearing interface of the bearing surface of the first pivot bushing and the bearing surface of the second pivot bushing is located in the clearance space between the overlapping portion of the first conduit section and overlapped portion of the second conduit section.

12. The articulated conduit coupling of claim 9 wherein:

(a) the first pivot device comprises means for lubricating the bearing surface of the first pivot bushing and the bearing surface of the second pivot bushing; and (b) the second pivot device comprises means for lubricating the bearing surface of the first pivot bushing and the bearing surface of the second pivot bushing.

13. The articulated conduit coupling of claim 1, further comprising seal means located within the clearance space between the overlapping portion of the first conduit section and the overlapped portion of the second conduit section.

14. The articulated conduit coupling of claim 13, wherein:

(a) the pivot means comprises:

a first pivot device pivotally interconnecting the overlapping portion of the first conduit section and overlapped portion of the second conduit section with the pivot axis on the diameter of the conduit coupling;

a second pivot device in diametrical alignment with the first pivot device across the conduit coupling pivotally interconnecting the overlapping portion of the first conduit section and the overlapped portion of the second conduit section with the pivot axis on the diameter of the conduit coupling and in diametrical alignment with the pivot axis of the first pivot device; and, (b) the sealing means comprises two semi-circular seals in circumferential alignment with each other in the clearance space between the overlapping portion of the first conduit section and overlapped portion of the second conduit section, one of the two semi-circular seals being located in one of the two arcuate segments of the clearance space between the first pivot device and the second pivot device and the other of the two semi-circular seals being located in the other one of the two arcuate segments of the clearance space between the first pivot device and the second pivot device, and each of the two semi-circular seals being in sealing contact with the concave interior surface of the overlapping portion of the first conduit section and in sealing contact with the convex exterior surface of the overlapped portion of the second conduit section.

15. The articulated conduit coupling of claim 14, wherein one end of each of the two semi-circular seals is in abutment with the first pivot device and the other end of each of the two semi-circular seals is in abutment with the second pivot device.

16. The articulated conduit coupling of claim 15, further comprising retaining means for retaining the two semi-circular seals in position in the longitudinal direction of the first conduit section and second conduit section.

* * * * *